United States Patent
Chari et al.

(10) Patent No.: US 7,754,295 B2
(45) Date of Patent: Jul. 13, 2010

(54) SINGLE SUBSTRATE GUEST-HOST POLYMER DISPERSED LIQUID CRYSTAL DISPLAYS

(75) Inventors: Krishnan Chari, Fairport, NY (US); Charles W. Lander, Wayland, NY (US)

(73) Assignee: Industrial Technology Research Institute, Hsinchu (TW)

( * ) Notice: Subject to any disclaimer, the term of this patent is extended or adjusted under 35 U.S.C. 154(b) by 294 days.

(21) Appl. No.: 11/477,211

(22) Filed: Jun. 29, 2006

(65) Prior Publication Data

US 2008/0003379 A1    Jan. 3, 2008

(51) Int. Cl.
*C09K 19/00* (2006.01)
*C09K 19/06* (2006.01)
*C09K 19/52* (2006.01)

(52) U.S. Cl. ........... 428/1.1; 430/20; 430/270.1; 252/299.01; 252/299.6; 349/117

(58) Field of Classification Search .......... 430/20, 430/270.1; 428/1.1; 252/299.01, 299.6; 349/117

See application file for complete search history.

(56) References Cited

U.S. PATENT DOCUMENTS

| | | | |
|---|---|---|---|
| 2,628,963 A | 2/1953 | Laucius et al. | |
| 3,864,022 A | 2/1975 | Moriyama et al. | |
| 3,960,750 A | 6/1976 | Moriyama et al. | |
| 4,122,027 A | 10/1978 | Cole, Jr. et al. | |
| 4,128,497 A | 12/1978 | Cole, Jr. et al. | |
| 4,137,193 A | 1/1979 | Osman et al. | |
| 4,145,114 A | 3/1979 | Coates et al. | |
| 4,435,047 A | 3/1984 | Fergason | |
| 4,610,803 A | 9/1986 | Claussen | |
| 4,668,050 A | 5/1987 | Aoki et al. | |
| 4,688,900 A | 8/1987 | Doane et al. | |
| 5,363,482 A | 11/1994 | Victor et al. | |
| 5,473,450 A * | 12/1995 | Yamada et al. | 349/84 |
| 5,835,174 A | 11/1998 | Clikeman et al. | |
| 6,245,399 B1 * | 6/2001 | Sahouani et al. | 428/1.31 |
| 6,271,898 B1 | 8/2001 | Clikeman et al. | |
| 6,423,368 B1 | 7/2002 | Stephenson et al. | |
| 6,704,073 B2 | 3/2004 | Stephenson et al. | |
| 6,839,158 B2 | 1/2005 | Albert et al. | |
| 7,557,875 B2 * | 7/2009 | Majumdar et al. | 349/89 |
| 2004/0217929 A1 | 11/2004 | Albert et al. | |
| 2004/0226820 A1 | 11/2004 | Webber et al. | |
| 2005/0110925 A1 | 5/2005 | Chari et al. | |
| 2006/0215077 A1 * | 9/2006 | Majumdar et al. | 349/88 |

FOREIGN PATENT DOCUMENTS

WO    03/050203    6/2003

OTHER PUBLICATIONS

Drzaic, P.S. in Liquid Crystal Dispersions, pp. 30-51, published by World Scientific, Singapore (1995).
Whitesides and Ross (J. Colloid Interface Sci. 169, pp. 48-59 (1995)).
Rudhardt et al. (Applied Physics Letters vol. 82, pp. 2610-2612, 2003).
Masutani et al., "A novel polarizer-free dye-doped polymer-dispersed liquid crystal for reflective TFT displays", Journal of the SID, vol. 12, 301-307 (2004).

* cited by examiner

*Primary Examiner*—Geraldina Visconti
(74) *Attorney, Agent, or Firm*—Alston & Bird LLP

(57) ABSTRACT

The present invention relates to a display comprising at least one substrate, at least one electronically modulated imaging layer and at least one electrically conductive layer, wherein the electronically modulated imaging layer comprises a self-assembled, close-packed, ordered monolayer of domains of guest-host material, wherein the guest-host material comprises a dichroic or pleochroic dye guest in a light modulating host in a fixed polymer matrix, and wherein the appearance of the display is independent of viewing angle.

26 Claims, 4 Drawing Sheets

SINGLE SUBSTRATE GUEST-HOST POLYMER DISPERSED LIQUID CRYSTAL DISPLAYS

FIELD OF THE INVENTION

The present invention relates to a single-substrate approach for guest-host polymer dispersed liquid crystal displays on flexible substrates suitable for low-cost high volume manufacture.

BACKGROUND OF THE INVENTION

There is significant interest in low cost flexible electronic displays. Typically, such displays comprise a light modulating component embedded in a binder (most commonly polymer) matrix that is coated over a conductive plastic support. Broadly speaking, a light modulating component is a material that changes its optical properties, such as its ability to reflect or transmit light, in response to an electric field. The light modulating component may be a liquid crystalline material, such as a nematic liquid crystal, a chiral nematic or cholesteric liquid crystal, a ferroelectric liquid crystal or a guest-host liquid crystal. The light modulating material may also be a water insoluble liquid containing particles that undergo electrophoresis or motion, such as rotation or translation, in response to an electric field. Displays comprising a liquid crystalline material in a polymer matrix are referred to as polymer dispersed liquid crystal (PDLC) displays. Of particular interest are PDLC displays, wherein the liquid crystalline material is a guest-host or dye-doped liquid crystal. These displays are attractive because unlike conventional twisted nematic liquid crystal displays, they do not require polarizers. Furthermore, they combine the advantages of fabrication on flexible substrates with a true paper-like or ink on paper appearance.

There are two main methods for fabricating PDLC devices: emulsion methods and phase separation methods. Emulsion methods have been described in U.S. Pat. Nos. 4,435,047 and 5,363,482. The liquid crystal is mixed with an aqueous solution containing polymer. The liquid crystal is insoluble in the continuous phase and an oil-in-water emulsion is formed when the composition is passed through a suitable shearing device, such as a homogenizer. The emulsion is coated on a conductive surface and the water allowed to evaporate. A second conductive surface may then be placed on top of the emulsion or imaging layer by lamination, vacuum deposition, or screen printing to form a device. While the emulsion methods are straightforward to implement, droplet size distributions tend to be broad, resulting in a loss in performance. For guest-host liquid crystal devices, also referred to herein as GHLCD devices, this typically means reduced contrast and brightness. Phase separation methods were introduced in an effort to overcome this difficulty.

Phase separation methods have been outlined in U.S. Pat. No. 4,688,900 and in Drzaic, P. S. in Liquid Crystal Dispersions, pgs. 30-51, published by World Scientific, Singapore (1995). The liquid crystal and polymer, or precursor to the polymer, are dissolved in a common organic solvent. The composition is then coated on a conductive surface and induced to phase separate by application of ultraviolet (UV) radiation or by the application of heat or by evaporation of the solvent, resulting in droplets of liquid crystal in a solid polymer matrix. A device may then be constructed utilizing this composition. Although phase separation methods produce dispersed droplets having more uniform size distributions, there are numerous problems with this approach. For example, the long term photostability of photopolymerized systems is a concern due to the presence of photoinitiators that produce reactive free radicals. Photoinitiators not consumed by the polymerization process can continue to produce free radicals that can degrade the polymer and liquid crystals over time. Furthermore, it is also known that UV radiation is harmful to liquid crystals. Specifically, exposure to UV radiation can lead to decomposition of the dichroic dye in a guest-host liquid crystal mixture, resulting in a change in the reflected color. The use of organic solvents may also be objectionable in certain manufacturing environments. Partitioning of the dichroic dye into the polymer matrix during phase separation is also a significant problem.

U.S. Pat. No. 6,423,368 and U.S. Pat. No. 6,704,073 propose to overcome the problems associated with the prior art methods through the use of droplets of the liquid crystal material prepared using a limited coalescence process. In this process, the droplet-water interface is stabilized by particulate species, such as colloidal silica. Surface stabilization by particulate species, such as colloidal silica, is particularly preferred as it can give narrow size distribution and the size of the droplets can be controlled by the concentration of the particulate species employed. The materials prepared via this process are also referred to as Pickering Emulsions and are described more fully by Whitesides and Ross (J. Colloid Interface Sci. 169, 48 (1995)). The uniform droplets may be combined with a suitable binder and coated on a conductive surface to prepare a device. The process provides improvement in brightness and contrast over prior art processes. It also overcomes some of the problems associated with photoinitiators and UV radiation. However, there is still much room for improvement, particularly in terms of the switching voltage or the voltage needed to change the orientation of the liquid crystal from one state to another. The latter has a significant effect on the overall cost of the display. A low switching voltage is extremely desirable for low cost displays.

The device described by U.S. Pat. No. 6,423,368 and U.S. Pat. No. 6,704,073 suffers from drawbacks because of the structure of the coated layer. Undesirably, there may be more than a monolayer of droplets between the two electrodes. Furthermore, the process of coating a heated emulsion of the liquid crystal in a gelatin binder onto a substrate with a conductive layer and subsequently lowering the temperature of the coating to change the state of the coated layer from a free flowing liquid to a gel state (referred to as a sol-gel transition) prior to drying the coating results in an extremely uneven distribution of droplets of liquid crystal. At the microscopic scale, there are regions of the coating containing overlapping droplets and other regions with no droplets at all between the electrodes. The uneven distribution of droplets results in a decrease in contrast and an increase in switching voltage.

U.S. Pat. No. 6,271,898 and U.S. Pat. No. 5,835,174 also describe compositions, suitable for flexible display applications, that employ very uniform sized droplets of liquid crystal in a polymer binder. However, no attempt is made to control the thickness or the distribution of droplets in the coated layer, resulting in less than optimum performance.

U.S. 2005/0110925 shows that the maximum contrast in a bistable chiral nematic liquid crystal display prepared by the limited coalescence method is obtained when the uniform liquid crystal domains or droplets are coated as substantially a monolayer on the first conductive support. The bistable states in these chiral nematic liquid crystal displays are the planar reflecting state and the weakly scattering focal conic state. Back-scattering of light from the weakly scattering focal conic state increases drastically when there is more than a monolayer of droplets between the conductive surfaces. While the method provides displays with an improvement in brightness and contrast, it still falls short of optimum performance because the gelatin binder is made to undergo a sol-gel transition prior to drying of the coating, resulting in an uneven structure. Furthermore, there is a viewing angle problem with chiral nematic liquid crystal displays. The color of the planar state of these displays is based on Bragg reflection of incident light, which is a strong function of viewing angle.

Rudhardt et al. (Applied Physics Letters vol. 82, page 2610, 2003) describe a method of fabricating a light modulating device, wherein a composition containing very uniform droplets of liquid crystal in an aqueous solution of polymer binder is spread on an indium tin oxide (ITO) coated glass surface and the water allowed to evaporate. The droplets of liquid crystal spontaneously self-assemble into a hexagonal close-packed (HCP) monolayer. A second ITO coated glass surface is placed over the coated layer of droplets as the top electrode to complete construction of the device. A uniform monolayer thickness is achieved for the coated layer and the close-packed distribution of droplets is also extremely well defined. Both features result in a low switching voltage. However, there are numerous problems with this approach. Firstly, the uniform droplets of liquid crystal are prepared by extrusion through a thin capillary into a flowing fluid. When a droplet at the tip of the capillary grows to reach critical size, viscous drag exceeds surface tension and breakoff occurs, producing highly monodisperse emulsions. Clearly, this method of creating one droplet at a time is not suitable for large scale manufacture. Secondly, the method by which the second (top) electrode is applied may be suitable for construction of small scale displays on rigid substrates, such as glass, but is not viable for large area low cost displays on flexible substrates.

U.S. Pat. No. 6,839,158 and US 2004/0217929A1 indicate that a close-packed monolayer of droplets of the light modulating component may be desirable for obtaining high brightness and contrast in a polymer dispersed electrophoretic display. However, the method of making droplets described in these applications is a standard emulsification process that does not result in emulsions having a narrow size distribution that is desirable for obtaining close-packed monolayers by spontaneous self-assembly. The preferred method of preparing droplets in US 2003/0137717A1 and US 2004/0217929A1 also involves encapsulation resulting in droplets or capsules in the size range of 20 to 200 microns with wall thickness of 0.2 to 10 microns. The relatively large droplet size and wall thickness result in high switching voltages. Encapsulation is clearly not desirable, but these applications do not teach how a second conducting layer is to be applied on top of the coated layer of droplets in the absence of encapsulation. In the absence of encapsulation, droplets of the light modulating component may directly come in contact with the organic solvent in the screen printed conducting ink, leading to contamination or poisoning of the light modulating component. This is particularly a concern if the light modulating component is a liquid crystal material.

To overcome the difficulties of US 2003/0137717A1 and US 2004/0217929A1, US 2004/0226820A1 teaches that a close-packed monolayer of droplets may be obtained by using electrodeposition, followed by washing after the droplets have been spread on a suitable surface using a coating knife or coating head, such as a slot die coating head. However, the additional steps of electrodeposition and washing are cumbersome and not suitable for manufacturing on a large scale. Even with these additional steps, a close-packed monolayer of uniform thickness is not achieved. The root mean square (RMS) surface roughness is about 6 microns, because of non-uniform droplets or capsules. This is a very high value of surface roughness that would result in irregular or incomplete curing if a UV curable screen printed conducive ink is used as the second electrode. The irregular curing will result in increased switching voltages. Furthermore, a surface roughness of this magnitude will also result in significant non-uniformity of switching voltage across the area of the display, since the switching voltage is directly related to the thickness of the coated layer.

WO 03/050203 describes a process where a guest-host liquid crystal composition is imbibed into a preformed polymer matrix containing cavities or voids. A uniform distribution of liquid crystal domains in a polymer matrix is obtained without subjecting the dye-doped liquid crystal composition to harmful UV radiation, as in the conventional polymerization-induced phase separation (PIPS) process. However, the process described in WO 03/050203 suffers from a major drawback. The preformed polymer matrix containing uniform voids has to be made by a two-substrate PIPS process. In a two-substrate method, a liquid composition has to be confined between two solid surfaces during fabrication. It is difficult to perform this operation on a large scale. A single-substrate approach that does not require a second confining surface during fabrication is much preferred for high throughput low cost manufacturing. Furthermore, the process of washing and re-filling is tedious and also not suitable for high volume manufacture.

For these reasons, an alternative approach is clearly needed. The object of this invention is to provide a novel emulsion based single substrate approach for guest-host PDLC that achieves a uniform monolayer of liquid crystal domains in a polymer matrix without the use solvents or UV irradiation that may be harmful to the dichroic dyes. Unlike cholesteric displays, guest-host liquid crystal displays have an appearance that is much closer to ink on paper.

PROBLEM TO BE SOLVED

There remains a need for a reduced cost, display having excellent brightness, high contrast, and low switching voltage.

SUMMARY OF THE INVENTION

The present invention relates to a display comprising at least one substrate, at least one electronically modulated imaging layer and at least one electrically conductive layer, wherein the electronically modulated imaging layer comprises a self-assembled, close-packed, ordered monolayer of domains of guest-host material, wherein the guest-host material comprises a dichroic or pleochroic dye guest in a light modulating host in a fixed polymer matrix, and wherein the appearance of the display is independent of viewing angle.

ADVANTAGEOUS EFFECT OF THE INVENTION

The present invention includes several advantages, not all of which are incorporated in a single embodiment. A display according to the present invention would be low cost and require low switching voltage and would demonstrate good contrast. The appearance of the display is independent of viewing angle.

DETAILED DESCRIPTION OF THE INVENTION

Figure 1:
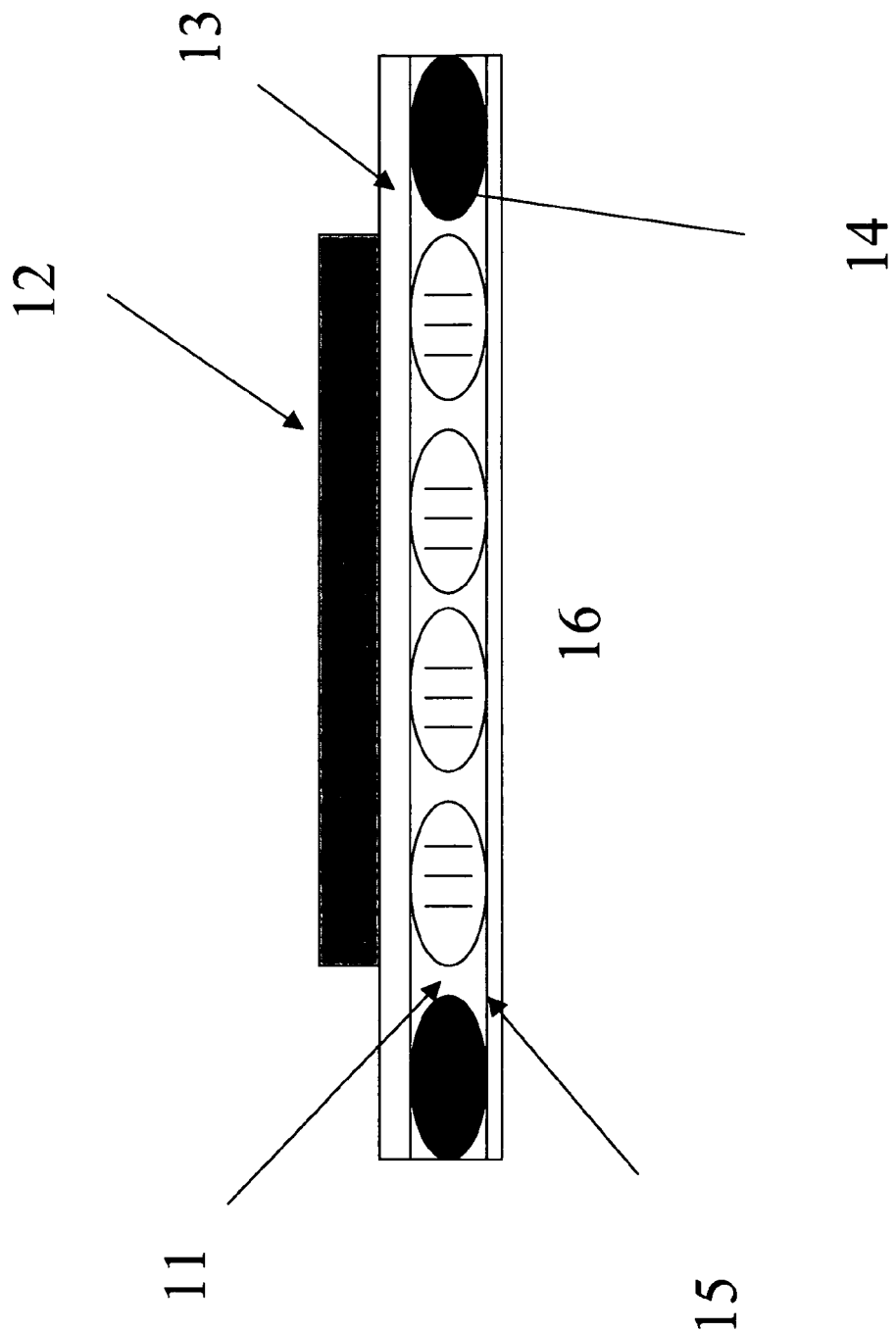
FIG. 1 illustrates one display architecture according to the present invention.

The present invention relates to a single-substrate approach for guest-host polymer dispersed liquid crystal displays on flexible substrates suitable for low-cost, high volume manufacture. The present invention relates to a display comprising at least one substrate, at least one electronically modulated imaging layer and at least one electrically conductive layer, wherein the electronically modulated imaging layer comprises a self-assembled, close-packed, ordered monolayer of domains of guest-host material, wherein the guest-host material comprises a dichroic or pleochroic dye guest in a light modulating host in a fixed polymer matrix, and wherein the appearance of the display is independent of viewing angle and a method of making the same. Electro-optic performance in terms of switching voltage and contrast should approach rigid glass cell devices because of the very uniform monolayer of liquid crystal domains.

Polymer dispersed liquid crystal "guest-host" display devices have been developed which eliminate the need for polarizers used in conventional twisted nematic (TN) liquid crystal displays The term "host" refers to the liquid crystal material, and the term "guest" refers to an agent that may be aligned by the host to produce contrasting light absorptive states in response to selective external stimuli. Typically, the "guest" is a dichroic or pleochroic dye.

Guest-host liquid crystalline materials may be used to create electronic displays that are viewable under ambient lighting. Furthermore, the liquid crystalline materials may be dispersed as micron sized droplets in an aqueous medium, mixed with a suitable binder material and coated on a flexible conductive support to create potentially low cost displays. The operation of these displays is dependent on the contrast between orientations of a dichroic dye in a nematic host. In order to derive the maximum contrast from these displays, it is desired that the guest-host liquid crystal domains or droplets are spread on a conductive support as a close-packed ordered monolayer.

It is possible to prepare such an ordered monolayer by first applying an aqueous dispersion of guest-host liquid crystal domains to the substrate in the presence of a suitable binder, allowing the domains or droplets to self-assemble into a close-packed ordered monolayer, preferably a hexagonal close-packed (HCP) monolayer, and then allowing the binder material to set or become fixed to preserve the close-packed ordered monolayer structure so that other layers can be spread above the imaging layer without affecting the close-packed structure.

In general, the light modulating imaging layer contains electrically modulated material domains dispersed in a binder. For purposes of the present invention, domains are defined to be synonymous with micelles and/or droplets. The electrically modulated material may be electrochromic material, rotatable microencapsulated microspheres, liquid crystal materials, cholesteric/chiral nematic liquid crystal materials, guest-host liquid crystal materials, polymer dispersed liquid crystals (PDLC), polymer stabilized liquid crystals, surface stabilized liquid crystals, smectic liquid crystals, ferroelectric material, electroluminescent material or any other of a very large number of light modulating imaging materials known in the prior art. The domains of the electrically modulated imaging layer include droplets having uniform domain size, with few, if any, parasitic domains, which are domains with random or uncontrolled sizes and which have undesirable electro-optical properties, within the dried coatings, as described in previous patent art. Preferred domain size is in the range of from 5-20 microns.

The display includes a suitable electrically modulated material disposed on a suitable support structure, for example, on or between one or more electrodes. The term "electrically modulated material" as used herein is intended to include any suitable nonvolatile material. Suitable materials for the electrically modulated material are described in U.S. patent application Ser. No. 09/393,553 and U.S. Provisional Patent Application Ser. No. 60/099,888, incorporated herein by reference.

The electrically modulated material may be an arrangement of particles or microscopic containers or microcapsules. Each microcapsule contains an electrophoretic composition of a fluid, such as a dielectric or emulsion fluid, and a suspension of colored or charged particles or colloidal material. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as GYRICON® particles. Specifically, GYRICON® particles describe a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A GYRICON® display maintains a given configuration until an electric field is actively applied to the display assembly. GYRICON® materials are disclosed in U.S. Pat. No. 6,147,791, U.S. Pat. No. 4,126,854 and U.S. Pat. No. 6,055,091, the contents of which are herein incorporated by reference.

According to one practice, the microcapsules may be filled with electrically charged white particles in a black or colored dye. Examples of electrically modulated material suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material.

The electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, ultraviolet fluorescent printings, designs and patterns underneath can be seen through.

The electrically modulated material may also include surface stabilized ferrroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of nonelectrically modulated material based materials that have the previously listed radiation absorbing or emitting characteristics. The electrically modulated material employed in connection with the present invention preferably has the characteristic that it does not require power to maintain display of indicia.

Another electrically modulated material is a light modulating material, such as a liquid crystalline material. The liquid crystalline material can be one of many different liquid crystal phases such as; nematic (N), chiral nematic (N*), or smectic, depending upon the arrangement of the molecules in the mesophase. Most preferred is a guest-host liquid crystal material where the host refers to the liquid crystal material and the guest refers to an agent such as a dichroic or pleochroic dye that may be aligned by the host to produce contrasting light absorptive states in response to a selective external stimulus such as an electric field.

Modern guest-host materials usually include at least one liquid crystal component as host. Preferably, the host is a nematic or smectic liquid crystal component. In general, the nematic liquid crystal host phase is composed of one or more mesogenic components combined to provide useful composite properties. The nematic component of the guest-host polymer dispersed liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxyiic acid and of cyclohexylcyclohexanecarboxylic acid, phenyl cyclohexanes, cyclohexylbiphenyls, phenyl cyclohexylcyclohexanes, cyclohexylcyclohexanes, cyclohexylcyclohexenes, cyclohexylcyclohexylcyclohexenes, 1,4-bis-cyclohexylbenzenes, 4,4-bis-cyclohexylbiphenyls, phenyl- or cyclohexylpyrimidines, phenyl- or cyclohexylpyridines, phenyl- or cyclohexylpyridazines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl) ethanes, 1-cyclohexyl-2',2-biphenylethanes, 1-phenyl-2-cyclohexylphenylethanes, optionally halogenated stilbenes, benzyl phenyl ethers, tolanes, substituted cinnamic acids and esters, and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y—Z—R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc-, wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2-CH2-, —CO—O—, —CH2-O—, —CO—S—, —CH2-S—, —COO-Phe-COO— or a single bond, with Y' being halogen, preferably chlorine, or —CN, R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in light modulating liquid crystal compositions.

Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The "guest" in a guest-host liquid crystal composition is typically a dichroic or pleochroic dye. Dichroism is the property whereby an oriented assembly of dye molecules exhibit relatively low absorption of a given wavelength of light in one state of orientation and a relatively high absorption of the same wavelength in another state of orientation with respect to the light source. The orientation can be brought about by dissolution of the dye in a liquid crystal solvent or by embedding the dye in a stretched plastic.

In order to achieve sufficient contrast and the high brightness required for colored and multi-colored display systems, dichroic dyes must be used which have good solubility and high order parameter. Solubility must be sufficiently high so that thin layers, for example, of twelve micrometers, have adequate light absorption in one of the oriented states. Ionic dyes will generally be inadequate, not only because of their low solubility, but also because they increase the electrical conductivity of liquid crystals.

Order parameter is a quantitative measure of the degree of molecular order of alignment in a given system. The contrast and brightness are both related to the order parameter S of the dye, where $S=(R-1)/(R+2)$ and R is the ratio of the light absorption in the dye measured with a polarizer respectively parallel and perpendicular to the nematic direction of the liquid crystal host at the wavelength of maximum absorption. High order parameter is promoted by dyes with elongated shape having a large ratio of molecular length to breadth, similar to the shape of the molecules of liquid crystal host material. To insure an elongated shape, the molecules should have a rigid structure which can be obtained, for example, by linking benzene or heterocyclic rings with double bonded groups. For the present invention, dye guest having an order parameter greater than 0.5 are preferred, greater than 0.5 are more preferred, and greater than 0.8 most preferred.

Conventional dichroic dyes include benzene-based azo dyes, stilbene-based dyes, and anthraquinone-based dyes. Particular dichroic dyes are disclosed in a series of patents of Cole Jr. et al., assigned to General Electric Company, in which a number of dichroic liquid crystal systems are shown. In U.S. Pat. No. 4,122,027, incorporated herein by reference, of Cole Jr. et al. a tris-azo dichroic dye is described having an order parameter S of 0.70. U.S. Pat. No. 4,179,395 of Cole Jr. et al., incorporated herein by reference, discloses a dichroic liquid crystal composition which includes a pentazo dichroic dye having an order parameter S of at least 0.65, and U.S. Pat. No. 4,128,497 of Cole Jr. et al., incorporated herein by reference, again shows tris-azo compounds useful in liquid crystal display systems because of their high order parameter and contrast characteristics. Other disclosures in the field of utilization of dyes in conjunction with liquid crystal display systems include U.S. Pat. No. 4,137,193 to Osman et al. and U.S. Pat. No. 4,145,114 to Coates et al., incorporated herein by reference. Osman et al. describe an azo dye guest component having an order parameter of at least 0.65 and an absorption maximum in the range of from 350 to 700 nanometers. The compounds shown in U.S. Pat. No. 4,137,193 include only one or at most two azo groups. Coates et al. show pleochroic dye compounds suitable for use in solution with liquid crystal material which may include from one to nine azo groups. U.S. Pat. No. 4,668,050, incorporated herein by reference, discloses thieno-[2,3-d]-thiazole compounds. Azo dyes having a biphenyl framework are advantageous in that they have a high extinction coefficient (coloring power), and that, since azo structures can be simultaneously incorporated respectively on both sides of the biphenyl framework, the cost of production is low and a dye having a large molecular length, so as to be suitable for use with liquid crystals can be easily produced. U.S. Pat. No. 4,610,803, incorporated herein by reference, shows various dichroic trisazo dyes, including yellow dichroic dyes having an azo group on each side of a biphenyl framework. A preferred dye is 4,4'-bis-(4-N,N-dimethylaminonaphthylazo)azobenzene having an order parameter of about 0.74 and a maximum absorption wavelength of about 555 nanometers (nm), which dye appears to be colored violet when acting on white light. Other preferred dyes include: 4,4'-bis-(4-methylaminonaphthylazo)azobenzene (having an order parameter of about 0.75 and a maximum absorption wavelength of about 595 nm); 4,4'-bis-(4-methylaminonaphthylazo)azobenzene (having an order parameter of about 0.72 and a maximum absorption wavelength of about 598 nm); 4,4'-bis-(4-aminonaphthylazo)azobenzene (having an order parameter of about 0.74 and a maximum absorption wavelength of about 580 nm); 4,4'-bis-(4,5-diaminonaphthylazo)azobenzene (having an order parameter of about 0.74 and a maximum absorption wavelength of about 595 nm); 4,4'-bis-(2,2-methylethyl-2,3-dihydroperimidin-6-ylazo) azobenzene (having an order parameter of about 0.72 and a maximum absorption wavelength of about 610 nm); and 4,4'-bis-(2,2-pentamethylene-2,3-dihydroperimidin-6-ylazo) azobenzene, having an order parameter of about 0.72 and a maximum absorption wavelength of about 605 nm. Another preferred dichroic liquid crystal composition has a bis-azo guest dichroic dye 4-(4-amino-2,5-dimethylphenylazo)-4'-dimethylaminobenzene dissolved in the liquid crystal host material; the mixture has an order parameter of about 0.69 and a maximum absorption wavelength of about 495 nanometers (nm), and the dichroic dye imparts an orange-red color to the composition when acting upon white light. Other preferred dichroic liquid crystal compositions use one of a group of tris-axo dichroic dyes, including: 4,4'-bis(4-dimethylaminophenylazo)-2,5-dimethylazobenzene (with an order parameter of about 0.7 and a maximum absorption wavelength of about 510 nm); 4(2-hydroxynaphtylazo)-4'-(4-dimethylaminophenylazo)-2,5-dimethylazobenzene (with an order parameter of about 0.7 and a maximum absorption wavelength of about 555 nm); 4,4'-bis(4-piperidinophenylazo)azobenzene (with an order parameter of about 0.74 and a maximum absorption wavelength of about 505 nm); 4,4'-bis(4-dimethylaminophenylazo)azobenzene (with an order parameter of about 0.72 and a maximum absorption wavelength of about 510 nm); 4,4'-bis(2-hydroxynaphthylazo) azobenzene (with an order parameter of about 0.7 and a maximum absorption wavelength of about 575 nm); 4,4'-bis (4-N,N-dimethylamino-2,6-dimethylphenylazo)azobenzene (with an order parameter of about 0.78 and a maximum absorption wavelength of about 550 nm); 4,4'-bis-(4-N,N-dimethylamino-2-phenylazo)azobenzene (with an order parameter of about 0.78 and a maximum absorption wavelength of about 555 nm); and 4,4'-bis-(4-N,N-diethylamino-2-methylphenylazo)azobenzene (with an order parameter of about 0.78 and a maximum absorption wavelength of about 570 nm). Other preferred dichroic liquid crystal compositions use one of a group of penta-azo dichroic dyes: 4,4'-bis[2,5-dimethyl-4-[4-(N,N-dimethylaminophenylazo)]phenylazo] azobenzene (with an order parameter of about 0.73 and a maximum absorption wavelength of about 525 nm); 4,4'-bis [2,5-dimethyl-4-(2-hydroxynaphthylazo)phenylazo]azobenzene, (with an order parameter of about 0.70 and a maximum absorption wavelength of about 545 nm); 4,4'-bis-[2,5-dimethyl-4-(2,2-methylethyl-2,3-dihydroperimidin-6-ylazo) phenylazo azobenzene (with an order parameter greater than 0.65 and a maximum absorption wavelength over the range from about 590 nm to about 620 nm); 4,4'-bis-[2,5-dimethyl-4-(4-ethylaminonaphthylazo)-phenylazo azobenzene (with an order parameter of about 0.80 and a maximum absorption wavelength of about 595 nm); and 4,4'-bis-[2,5-dimethyl-4-(4-methylaminonaphthylazo)phenylazo]azobenzene (with an order parameter of about 0.80 and a maximum absorption wavelength of about 595 nm).

Dyes of the azo and anthraquinone types are well known in the prior art. Blue azo dyes of high order parameter and absorption peak at 595-610 nm are commercially available. These dyes also absorb at wavelengths greater than 610 nm, but the absorption at the higher wavelengths is relatively low. One anthraquinone dye, commercially available under the trade name Waxoline Green G, has an absorption peak of about 650 nm, however, this dye has a low order parameter of only about 0.4 to 0.45 and is therefore not satisfactory for making liquid crystal displays of good black, blue or green colors.

Other commercially available anthraquinone dyes, such as dye D-27 sold by B.D.H. Chemicals, have better order parameter, for example, 0.60 to 0.66, however, the peak absorption of such dyes is less than that of the Waxoline Green G described above, the peak absorption dye of D-27 being about 612 nm. Another anthraquinone dye, 4,8-diamino-1,5-dihydroxy-3-(4-heptyloxyphenyl) anthraquinone, produced by Hoffman-LaRoche Company, has an order parameter of 0.74 with peak absorption at 645 nm. A blue anthraquinone-based dye known as 1,4-di-n-butylamino anthraquinone is used in conjunction with other dyes in U.S. Pat. No. 3,864,022 and U.S. Pat. No. 3,960,750, incorporated herein by reference. This dye is used in conjunction with liquid crystal molecules, however, it has a peak absorption of less than 650 nm and a relatively low order parameter. Other photostable anthraquinone pleochroic dyes have been disclosed by B.D.H. Chemicals Limited, Poole, Dorset, however, such dyes have absorption peaks less than 650 nm and generally have relatively low order parameters, that is, S is less than 0.60. Blue dyes of the anthraquinone series suitable for the coloring of polyethylene terephthalate fibers known as "Dacron", are described in U.S. Pat. No. No. 2,628,963, incorporated herein by reference. The dyes in U.S. Pat. No. 2,628,963 are the 1,4-diamino-2,3-anthraquinone-dicarboxamides.

Dichroic dyes having three azo (—N═N—) bonding groups and having suitable order parameters, S, greater than 0.70 are disclosed in U.S. Pat. No. 4,122,027, incorporated herein by reference. The high order parameter dichroic dyes in U.S. Pat. No. 4,122,027 are 4,4'-bis-(substituted naphthylazo) azobenzenes. Although the foregoing dyes of U.S. Pat. No. 4,122,027 are suitable for coloring liquid crystal mixtures and have adequate properties, e.g., solubility, for use in liquid crystal displays, it is always desirable to improve those properties and to provide azo dyes having more intense or saturated colors especially at wavelengths over 600 nm.

Dichroic liquid crystal mixtures, each having a liquid crystal material and at least one dichroic dye dissolved therein, the dichroic dye having a plurality of azo bonding groups and characterized by an order parameter, S, greater than 0.65 and by a maximum absorption wavelength in the range of about 495 nm to about 620 nm, are disclosed in U.S. Pat. No. 4,128,497, incorporated herein by reference. Although the dyes of U.S. Pat. No. 4,128,497 can be dissolved in liquid crystal compositions to form liquid crystal displays of suitable colors, it is always desirable to improve the colors of dichroic dyes used in liquid crystal compositions, especially to provide dyes, the absorption band of which lies at longer wavelengths, due to the shift of the wavelength region, and, thereby, provide more saturated colors, especially more saturated blue colors, without sacrifice of the solubility of the dye in the liquid crystal, and preferably increasing the solubility of the dye in the liquid crystal composition.

Other dye compounds suitable for use in solution with a liquid crystal material and containing azo linkages, including the tris-azo dyes, are well-known in the prior art. In U.S. Pat. No. 4,145,114, incorporated herein by reference, a substantial number of dye compounds are proposed for use in liquid crystal materials. Although pleochroic dyes are proposed in U.S. Pat. No. 4,145,114, there is no evidence therein that any unusual properties of a segment of the dyes covered by the general formulas were uncovered or suggested with respect to the tris-azo dyes having methyl substituents in the 2- and 5-positions upon one of the benzene rings adjacent the "A" moiety joining two benzene rings even though U.S. Pat. No. 4,145,114 discloses that any one of the positions on any one of the benzene rings may be substituted by a methyl. Although numerous pleochroic dyes are proposed in U.S. Pat. No. 4,145,114, it is always desirable to improve azo dyes and to improve liquid crystal displays containing azo dyes. To that end, it is desirable to select specific characteristics, compositions and conditions within such broadly proposed fields of the prior art to improve thereon, and specifically, to improve classes of azo dyes and to improve liquid crystal displays containing such classes of azo dyes.

The most preferred dichroic or pleochroic dye guests are at least one dye selected from the group consisting of 4,4'-bis (4-N,N-dimethylamino-2,6-dimethylphenylazo)azobenzene, 4,4'-bis-(4-N,N-dimethylamino-2-phenylazo)azobenzene, 4,4'-bis-(4-N,N-diethylamino-2-methylphenylazo) azobenzene, 4,4'-bis-[2,5-dimethyl-4-(4-ethylaminonaphthylazo)-phenylazo azobenzene and 4,4'-bis-[2,5-dimethyl-4-(4-methylaminonaphthylazo)phenylazo] azobenzene.

The liquid crystalline droplets or domains are typically dispersed in a continuous binder. In one embodiment, a guest-host liquid crystal composition may be dispersed in a continuous polymeric matrix. Such materials are referred to as "polymer dispersed liquid crystal" materials or "PDLC" materials. Suitable hydrophilic binders include both naturally occurring substances such as proteins, protein derivatives, cellulose derivatives (for example cellulose esters), gelatins and gelatin derivatives, polysaccharides, casein, and the like, and synthetic water permeable colloids such as poly(vinyl lactams), acrylamide polymers, latex, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

Gelatin is derived from a material called collagen. Collagen has a high content of glycine and of the imino acids proline and hydroxyproline. It has a triple helix structure made up of three parallel chains. When collagen in water is heated above a certain temperature, it will denature to form gelatin. Concentrated gelatin solutions form rigid gels when cooled. This phenomenon is known as sol-gel transition or thermal gelation and is the result of secondary bonding, such as hydrogen bonding, between gelatin molecules in solution. It should be noted that this property is not limited to gelatin;

for example, aqueous solutions of agar, a polysaccharide from seaweed, will also form rigid gels upon cooling. Partial renaturation of gelatin also occurs upon cooling. The latter refers to the formation of triple helix collagen-like structures. The structures do not form if gelatin is not chill set prior to drying. In other words, molecules of gelatin remain in a random coil configuration if the coating is dried at a temperature that is above the sol-gel transition temperature. The presence of helix structures may be detected by x-ray diffraction. Chill set gelatin, containing molecules in a helix configuration, has relatively low solubility in cold water and organic solvents compared to the random coil gelatin. This property enables chill set gelatin to be an effective barrier between the organic solvent in printed conductive inks and the light modulating material.

Useful "gelatins," as that term is used generically herein, include alkali treated gelatin (cattle bone or hide gelatin), acid treated gelatin (pigskin gelatin), fish skin gelatin and gelatin derivatives such as acetylated gelatin, and phthalated gelatin. Any type of gelatin may be used, provided the gelatin has sufficient molecular weight to allow the crosslinker to crosslink or the fixative to fix or set. Fish gelatins have lower imino acid content compared to mammalian gelatins. The sol-gel transition temperature or thermal gelation temperature or chill set temperature is lower if the imino acid content is smaller. For example, the chill set temperature of gelatins derived from deep water fish such as cod, haddock or pollock is significantly lower than that of cattle gelatin. Aqueous solutions of these gelatins remain fluid until about 10° C., whereas solutions of cattle gelatin will gel at room temperature. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water soluble polyvinyl compounds such as polyvinyl alcohol, polyacrylamide, poly(vinylpyrrolidone), and the like. Useful liquid crystal to gelatin ratios should be between 6:1 and 0.5:1 liquid crystal to gelatin, preferably 3:1.

Other organic binders such as polyvinyl alcohol (PVA) or polyethylene oxide (PEO) can be used as minor components of the binder in addition to gelatin. Such compounds are preferably machine coatable on equipment associated with photographic films.

Aqueous suspensions of polymer latex particles are also suitable as binder. The latex particles may be based on any suitable monomer or monomers such as urethane, styrene, vinyl toluene, p-chlorostyrene, vinyl napththalene, ethylenically unsaturated mono-olefins, such as ethylene, propylene, butylene, and isobutylene; vinyl halides such as vinyl chloride, vinyl bromide, vinyl fluoride, vinyl acetate, vinyl propionate, vinyl benzoate and vinyl butyrate; esters of alpha-methylene aliphatic mono-carboxylic acids such as methyl acrylate, ethyl acrylate, n-butyl acrylate, isobutylacrylate, dodecyl acrylate, n-octyl acrylate, 2-chloroethyl acrylate, phenyl acrylate, methyl-alpha-chloroacrylate, methyl methacrylate, ethyl methacrylate and butyl methacrylate; acrylonitrile, methacrylonitrile, acrylamide, vinyl ethers such as vinyl methyl ether, vinyl isobutyl ether and vinyl ethyl ether; vinyl ketones such as vinyl methylketone, vinyl hexyl ketone and methyl isopropyl ketone; vinylidene halides such as vinylidene chloride and vinylidene chlorofluoride; and N-vinyl compounds such as N-vinyl pyrrole, N-vinyl carbazole, N-vinyl indole and N-vinyl pyrrolidone divinyl benzene, ethylene glycol dimethacrylate mixtures thereof; and the like. Also preferred are aqueous suspensions of polyesters and polyolefins or combinations thereof. The use of aqueous suspensions of polymer latex particles as binder is preferred. The most preferred polymer latex is polyurethane latex.

The binder may have a low ionic content. The presence of ions in a binder may hinder the development of an electrical field across the dispersed liquid crystal material. Additionally, ions in the binder can migrate in the presence of an electrical field, chemically damaging the light modulating layer. The coating thickness, size of the liquid crystal domains, and concentration of the domains of liquid crystal materials are designed for optimum optical properties. Heretofore, the dispersion of liquid crystals is performed using shear mills or other mechanical separating means to form domains of liquid crystal within light modulating layer.

A conventional surfactant can be added to the emulsion to improve coating of the layer. Surfactants can be of conventional design, and are provided at a concentration that corresponds to the critical micelle concentration (CMC) of the solution. A preferred surfactant is Aerosol OT, commercially available from Cytec Industries, Inc.

In a preferred embodiment, the liquid crystal and gelatin emulsion is coated and dried to optimize the optical properties of the light modulating layer. In one embodiment, the layer is coated to provide a final coating containing a substantial monolayer of guest-host liquid crystal domains. The term "substantial monolayer" is defined by the Applicants to mean that, in a direction perpendicular to the plane of the display, there is no more than a single layer of domains sandwiched between the electrodes over 90% of the area of the display (or the imaging layer). The amount of material needed for a monolayer can be determined by calculation based on individual domain size.

A bacteriostat to prevent gelatin degradation during emulsion storage and during material operation may be included. The gelatin concentration in the emulsion, when coated, is preferably between about 2 and 20 weight percent based on the weight of the emulsion. In the final emulsion, the liquid crystal material may be dispersed at 15% concentration in a 5% gelatin aqueous solution.

A crosslinking agent or hardener may be used to preserve the architecture of the close-packed monolayer of coated droplets after it has been formed by self-assembly. Other methods of fixing the architecture of the close-packed monolayer of domains may also be used, although crosslinking is preferred. The effects of the crosslinker may be characterized based on the reaction of certain amino acid residues in gelatin. For example, the amount of histadine is typically reduced from about 4 residues per 1000 to less than 2.5 residues per 1000 upon cross-linking. Also the amount of hydroxylysine is reduced from about 6.9 residues per 1000 to less than 5.1 residues per 1000. Many conventional hardeners are known to crosslink gelatin. Gelatin crosslinking agents (i.e., the hardener) are included in an amount of at least about 0.01 wt. % and preferably from about 0.1 to about 10 wt. % based on the weight of the solid dried gelatin material used (by dried gelatin it is meant substantially dry gelatin at ambient conditions as for example obtained from Eastman Gel Co., as compared to swollen gelatin), and more preferably in the amount of from about 1 to about 5 percent by weight. More than one gelatin crosslinking agent can be used if desired.

Suitable hardeners may include inorganic, organic hardeners, such as aldehyde hardeners and olefinic hardeners. Inorganic hardeners include compounds such as aluminum salts, especially the sulfate, potassium and ammonium alums, ammonium zirconium carbonate, chromium salts such as chromium sulfate and chromium alum, and salts of titanium dioxide, and zirconium dioxide. Representative organic hardeners or gelatin crosslinking agents may include aldehyde and related compounds, pyridiniums, olefins, carbodiimides, and epoxides. Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2(1H)-pyrimidinone polymers (Sequa SUNREZ® 700), polymers of the type having a glyoxal polyol reaction product consisting of 1 anhydroglucose unit: 2 glyoxal units (SEQUAREZ® 755 obtained from Sequa Chemicals, Inc.), DME-Melamine non-formaldehyde resins such as Sequa CPD3046-76 obtained from Sequa Chemicals Inc., and 2,3-dihydroxy-1,4-dioxane (DHD).

Hardeners that contain active olefinic functional groups include, for example, bis-(vinylsulfonyl)-methane (BVSM), bis-(vinylsulfonyl-methyl) ether (BVSME), 1,3,5-triacryloylhexahydro-s-triazine, and the like. Active olefinic compounds are defined as compounds having two or more olefinic bonds, especially unsubstituted vinyl groups, activated by adjacent electron withdrawing groups (The Theory of the Photographic Process, 4th Edition, T. H. James, 1977, Macmillan Publishing Co., page 82, incorporated herein by reference). Other examples of hardening agents can be found in standard references such as The Theory of the Photographic Process, T. H. James, Macmillan Publishing Co., Inc. (New York 1977), incorporated herein by reference, or in Research Disclosure, September 1996, Vol. 389, Part IIB (Hardeners) or in Research Disclosure, September 1994, Vol. 365, Item 36544, Part IIB (Hardeners), incorporated herein by reference. Research Disclosure is published by Kenneth Mason Publications, Ltd., Dudley House, 12 North St., Emsworth, Hampshire P010 7DQ, England. Olefinic hardeners are most preferred, as disclosed in U.S. Pat. Nos. 3,689,274, 2,994, 611, 3,642,486, 3,490,911, 3,635,718, 3,640,720, 2,992,109, 3,232,763, and 3,360,372, all incorporated herein by reference.

Among hardeners of the active olefin type, a preferred class of hardeners particularly are compounds comprising two or more vinyl sulfonyl groups. These compounds are hereinafter referred to as "vinyl sulfones". Compounds of this type are described in numerous patents including, for example, U.S. Pat. Nos. 3,490,911, 3,642,486, 3,841,872 and 4,171,976, all incorporated herein by reference. Vinyl sulfone hardeners are believed to be effective as hardeners as a result of their ability to crosslink polymers making up the colloid.

After coating and drying the latex particles coalesce to form a continuous film containing the droplets of liquid crystal. This film is not disturbed if a second aqueous layer is coated above it thereby eliminating the need for cross-linking. A crosslinking agent or hardener may be used to preserve the architecture of the close-packed monolayer of coated droplets after it has been formed by self-assembly if a water-soluble polymer is used as binder.

The liquid crystalline droplets or domains may be formed by any method, known to those of skill in the art, which will allow control of the domain size. For example, Doane et al. (*Applied Physics Letters*, 48, 269 (1986)), incorporated herein by reference, disclose a polymer dispersed liquid crystal comprising approximately 0.4 µm droplets of nematic liquid crystal 5CB in a polymer binder. A phase separation method is used for preparing the polymer dispersed liquid crystal. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)), incorporated herein by reference, disclose a polymer dispersed liquid crystal comprising a guest-host mixture in a polymer binder. Once again a phase separation method is used for preparing the polymer dispersed liquid crystal. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

In a preferred embodiment, a method referred to as "limited coalescence" is used to form uniformly sized emulsions of liquid crystalline material. For example, the liquid crystal material can be homogenized in the presence of finely divided silica, a coalescence limiting material, such as LUDOX® from DuPont Corporation. A promoter material can be added to the aqueous bath to drive the colloidal particles to the liquid-liquid interface. In a preferred embodiment, a copolymer of adipic acid and 2-(methylamino)ethanol can be used as the promoting agent in the water bath. The liquid crystal material can be dispersed using ultrasound to create liquid crystal domains below 1 micron in size. When the ultrasound energy is removed, the liquid crystal material coalesces into domains of uniform size. The limited coalescence process is described more fully by Whitesides and Ross (J. Colloid Interface Sci. 169, 48 (1995)), by Giermanska-Kahn, Schmitt, Binks and Leal-Calderon (Langmuir, 18, 2515 (2002)), and U.S. Pat. No. 6,556,262, all incorporated herein by reference.

The distribution of droplet sizes is such that the coefficient of variation (cv) defined as the standard deviation of the distribution divided by the arithmetic mean is less than 0.25, preferably less than 0.2 and most preferably less than 0.15. The limited coalescent materials can be coated using a photographic emulsion coating machine onto sheets of polyester having an indium tin oxide coating with a sheet conductivity of 300 Ohms per square. The coating can be dried to provide a polymerically dispersed guest-host coating. By using limited coalescence, there are few, if any, parasitic smaller domains (having undesirable electro-optical properties) within the dried coatings.

The size ranges of domains in the dried coating are varied as the mixture dries and the domains flatten. In one embodiment, the resulting domains are flattened by the drying process and have on average a thickness substantially less than their length. The flattening of the domains can be achieved by proper formulation and sufficiently rapid drying of the coating.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried. Most preferably the imaging layer or light modulating layer has a thickness between 2 to 10 microns, particularly if the light modulating material is a guest-host liquid crystal.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

In U.S. Pat. No. 3,600,060, incorporated herein by reference, the domains of the dried light modulating material had particle size varying in diameter by a ratio of 10:1. This creates large domains and smaller parasitic domains. Parasitic domains have reduced characteristics when compared with optimized larger domains. The reduced characteristics include reduced brightness and if the parasitic domains are small enough diminished bistability of the guest-host liquid crystal.

The dispersed domains have an average diameter of 2 to 30 microns, preferably 5 to 15 microns. The domains are dispersed in an aqueous suspension. The size ranges for the dried coating are varied as the mixture dries and the domains flatten.

By varying the amount of silica and copolymer relative to the liquid crystalline material, uniform domain size emulsions of the desired average diameter (by microscopy), can be produced. This process produces domains of a selected average diameter.

It is well documented that the switching voltage increases linearly with thickness. Since it is desirable to have the lowest possible switching voltage, a uniform thickness is most preferred for the coated layer of droplets, provided the droplets have a close-packed structure. Under certain conditions, for example, drying, monodisperse droplets of the light modulating material will spontaneously self-assemble on a surface into a hexagonal close-packed (HCP) structure. The process has been described in detail by Denkov et al. (Nature, vol. 361, p. 26, 1993), incorporated herein by reference. When an aqueous suspension of droplets is spread on a surface, the droplets initially assume a random, disordered or uncorrelated distribution. However, as a function of drying, when the level of water reaches the top of the droplets, there is a strong attractive force known as the capillary force that drives the droplets into a close-packed ordered or correlated structure. The attractive energy of the capillary force is much greater than the thermal energy. However, it is important that lateral movement of droplets is not impeded by a strong attraction to the surface or by an increase in viscosity of the medium in which they are suspended. The latter would happen if the binder is gelatin and the coated layer of droplets is chill set prior to drying.

The formation of a close-packed structure in two dimensions, starting from a random distribution of droplets, is sometimes referred to as two-dimensional crystallization and should have a monodisperse population of droplets or a population of droplets having low polydispersity (Kumacheva et al. Physical Review Letters vol. 91, page 1283010-1, 2003), incorporated herein by reference. A population of droplets of light modulating material having sufficiently low polydispersity to create a close-packed structure may be achieved by the limited coalescence process. The close-packed structure is readily observable under an optical microscope. Furthermore, the close-packed structure has a repeat pattern or periodicity wherein the repeat distance is of the order of the wavelength of visible light. A coating having such a pattern exhibits Fraunhofer diffraction when placed before a source of visible light such as a visible light laser. The phenomenon of Fraunhofer diffraction is described more fully by Lisensky et al. Journal of Chemical Education, vol. 68, February 1991, incorporated herein by reference.

For perfectly monodisperse droplets (cv less than 0.1), a hexagonal close-packed (HCP) structure is obtained. The diffraction pattern for such a structure is in the form of spots. If there is a minor level of polydispersity (cv between 0.1 and 0.2), the diffraction pattern of the close-packed structure is in the form of a single ring or a set of concentric rings.

In a most preferred embodiment, the close-packed monolayer structure of coated droplets is preserved after the coating has dried. This allows a second aqueous layer to be coated above the layer containing the light modulating material without disturbing the close packed organization. In a preferred embodiment, the second aqueous layer functions as a protective overcoat for the light modulating material. In a still preferred embodiment, the second aqueous layer may contain a contrast control agent such as dispersed titania particles to create a white background.

Another aspect of the present invention relates to a display sheet comprising a substrate, an electrically conductive layer formed over the substrate, and a liquid crystal containing imaging layer comprising a guest-host material formed by the above described methods disposed over the electrically conductive layer.

As used herein, the phrase a "liquid crystal display" (LCD) is a type of flat panel display used in various electronic devices. At a minimum, a liquid crystal devices comprises a substrate, at least one conductive layer and a liquid crystal layer. Liquid crystal devices may also comprise two sheets of polarizing material with a liquid crystal solution between the polarizing sheets. The sheets of polarizing material may comprise a substrate of glass or transparent plastic. The liquid crystal device may also include functional layers. In one embodiment of a liquid crystal device, a transparent, multilayer flexible support is coated with a conductive layer, which may be patterned, onto which is coated the light modulating liquid crystal layer. Another conductive layer is applied and overcoated with a dielectric layer to which dielectric conductive row contacts are attached, including via holes that permit interconnection between conductive layers and the dielectric conductive row contacts. An optional nanopigmented functional layer may be applied between the liquid crystal layer and the other (second) conductive layer.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, thus exhibiting different light reflecting characteristics according to its phase and/or state.

A typical display in its simplest form comprises a sheet supporting a conventional polymer dispersed electrically modulated material. The sheet includes a substrate. Substrate can be made of a polymeric material, such as Kodak Estar film base formed of polyester plastic, and have a thickness of between 20 and 200 microns. For example, substrate can be a 80 micron thick sheet of transparent polyester. Other polymers, such as transparent polycarbonate, can also be used. Alternatively, substrate can be thin, transparent glass.

In a preferred embodiment of the invention, the display device or display sheet has simply a single imaging layer of liquid crystal material along a line perpendicular to the face of the display, preferably a single layer coated on a flexible substrate. Such a structure, as compared to vertically stacked imaging layers each between opposing substrates, is especially advantageous for monochrome shelf labels and the like. Structures having stacked imaging layers, however, are optional for providing additional advantages in some case.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post manufacturing conditions such as in a process line of a displays manufacturer. Certain of the plastic substrates discussed below can withstand higher processing temperatures of up to at least about 200° C., some up to 300-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene) fluoropolymer (PETFE), and poly (methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan, Zeanor T made by Zeon Chemicals L. P., Tokyo Japan, and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains ultraviolet cured polyester acrylate and colloidal silica. When deposited on Arton, it has a surface composition of 35 atom % C, 45 atom % O, and 20 atom % Si, excluding hydrogen. Another particularly preferred hard coating is the acrylic coating sold under the trademark "Terrapin" by Tekra Corporation, New Berlin, Wis. The substrate used may also be a removable substrate.

The display contains one conductive layer. Preferably, there is also at least one other conductive layer. The conductive layers may be placed directly in contact with the light modulating layer. Alternatively any number of other layers may be placed intervening the light modulating layer and the conductive layer. However, care should be taken to ensure that the placement of the intervening layer does not significantly deteriorate the electrical performance of the device, such as requiring higher electrical field to switch the liquid crystal device.

One conventional conductive layer which may be used with the present invention typically is comprised of a primary metal oxide and is preferably transparent. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation, incorporated herein by reference. In addition to the primary oxide such as indium tin oxide, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.), incorporated herein by reference. Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC sputtering or RF-DC sputtering, depending upon the material or materials of the underlying layer. The conductive layer may be a transparent, electrically conductive layer of tin oxide or indium tin oxide (ITO), or polythiophene (PEDOT). Typically, the conductive layer is sputtered onto the substrate to a resistance of less than 250 Ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 Ohms per square resistivity. An exemplary preferred indium tin oxide layer has a % T greater than or equal to 80% in the visible region of light, that is, from greater than 400 nm to 700 nm, so that the film will be useful for display applications. In a preferred embodiment, the conductive layer comprises a layer of low temperature indium tin oxide, which is polycrystalline. The indium tin oxide layer is preferably 10-120 nm in thickness, or 50-100 nm thick to achieve a resistivity of 20-60 Ohms/square on plastic. An exemplary preferred indium tin oxide layer is 60-80 nm thick. The light modulating material is coated over patterned indium tin oxide conductor to provide a polymer dispersed guest-host coating having a dried thickness of less than 50 microns, preferably less than 25 microns, more preferably less than 15 microns, most preferably less than about 10 microns.

The conductive layer is preferably patterned. The conductive layer is preferably patterned into a plurality of electrodes. The patterned electrodes may be used to form a liquid crystal device. In another embodiment, two conductive substrates are positioned facing each other and guest-host liquid crystals are positioned there between to form a device. The patterned indium tin oxide conductive layer may have a variety of dimensions. Exemplary dimensions may include line widths of 10 microns, distances between lines, that is, electrode widths, of 200 microns, depth of cut, that is, thickness of indium tin oxide conductor, of 100 nanometers. Indium tin oxide thicknesses on the order of 60, 70, and greater than 100 nanometers are also possible.

In a typical matrix-addressable light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode can be formed over the electrode layers. For example, in U.S. Pat. No. 5,703,436 to Forrest et al., incorporated herein by reference, transparent indium tin oxide (ITO) is used as the Hole injecting electrode, and a Mg—Ag—ITO electrode layer is used for electron injection.

In addition to a second conductive layer, other means may be used to produce a field capable of switching the state of the liquid crystal layer as described in, for example, U.S. Pat Appl. Nos. 20010008582 A1, 20030227441 A1, 20010006389 A1, and U.S. Pat. Nos. 6,424,387, 6,269,225, and 6,104,448, all incorporated herein by reference.

For higher conductivities, the other conductive layer(s) may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the other conductive layer or layers comprise at least one of gold, silver and a gold/silver alloy, for example, a layer of silver coated on one or both sides with a thinner layer of gold. See, Int. Publ. No. WO 99/36261 by Polaroid Corporation, incorporated herein by reference. In another embodiment, the other conductive layer or layers may comprise a layer of silver alloy, for example, a layer of silver coated on one or both sides with a layer of indium cerium oxide (InCeO). See U.S. Pat. No. 5,667,853, incorporated herein in by reference.

These other conductive layers may be patterned by irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

In one embodiment, the other conductors are a printed conductive ink such as ELECTRODAG 423SS screen printable electrical conductive material from Acheson Corporation. Such printed materials are finely divided graphite particles in a thermoplastic resin. These conductors are formed using printed inks to reduce display cost. The use of a flexible support for substrate layer, laser etched conductive layer, machine coating polymer dispersed guest-host layer, and printing other conductors permit the fabrication of very low cost displays. Small displays formed using these methods can be used as electronically rewritable transaction cards for inexpensive, limited rewrite applications.

The liquid crystal device may also comprise at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$ Ohms/sq. Above $10^{12}$ Ohms/sq., the antistatic layer typically does not provide sufficient conduction of charge to prevent charge accumulation to the point of preventing fog in photographic systems or from unwanted point switching in liquid crystal displays. While layers greater than $10^5$ Ohms/sq. will prevent charge buildup, most antistatic materials are inherently not that conductive and in those materials that are more conductive than $10^5$ Ohms/sq., there is usually some color associated with them that will reduce the overall transmission properties of the display. The antistatic layer is separate from the highly conductive layer of indium tin oxide and provides the best static control when it is on the opposite side of the web substrate from that of the indium tin oxide layer. This may include the web substrate itself.

Another type of functional layer may be a color contrast layer. Color contrast layers may be radiation reflective layers or radiation absorbing layers. In some cases, the rearmost substrate of each display may preferably be painted white. The color contrast layer may also be other colors. In another embodiment, the "white" layer comprises milled nonconductive pigments. The materials are milled below 1 micron to form "nanopigments". In a preferred embodiment, the white layer reflects all wavelengths of light across the visible light spectrum, that is from 400 nanometers to 700 nanometers wavelength. The white layer may contain white pigment dispersions such as dispersions of titania. The color contrast layer may also be formulated to function as a barrier layer.

The functional layer may also comprise a dielectric material. A dielectric layer, for purposes of the present invention, is a layer that is not conductive or blocks the flow of electricity. This dielectric material may include a ultraviolet curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a conductive layer to the light modulating layer.

The liquid crystal containing composition of the invention can be applied by any of a number of well known techniques, such as dip coating, rod coating, blade coating, air knife coating, slide (or bead) coating, curtain coating, and the like.

After coating, the layer is generally dried by simple evaporation, which may be accelerated by known techniques such as convection heating. Known coating and drying methods are described in further detail in Research Disclosure No. 308119, Published December 1989, pages 1007 to 1008, incorporated herein by reference.

A coated sheet can be formed using inexpensive, efficient layering methods. A single large volume of sheet material can be coated and formed into various types of smaller sheets for use in display devices such as transaction cards, shelf labels, large format signage, and the like. Displays in the form of sheets in accordance with the present invention are inexpensive, simple, and fabricated using low cost processes.

In the preferred embodiment, the imaging layer or light modulating layer comprising a guest-host polymer dispersed liquid crystal composition is first applied and maintained above the chill set temperature or sol-gel transition temperature of gelatin. After drying, the binder in this layer is allowed to crosslink to preserve the close-packed monolayer distribution of coated droplets. A second aqueous layer containing gelatin is then applied. The second aqueous layer contains dispersed titania particles to provide a white background. The coating is chill set prior to drying of the second layer in order to allow the gelatin molecules in the second layer to adopt a helix structure In a preferred commercial embodiment, the substrate to be coated is in the form of a moving web. After completing the manufacture of a coated liquid crystal sheet, the sheet material can be cut into a plurality of smaller, individual areas for use in various display or other applications.

A close-packed monolayer of uniform thickness may provide enhanced performance with respect to surface roughness. In conventional liquid crystal coatings containing non-uniform droplets or capsules, the root mean square (RMS) surface roughness has been measured at about 6 microns. This is a very high value of surface roughness that would result in irregular or incomplete curing if a UV curable screen printed conducive ink is used as the second electrode. The irregular curing will result in increased switching voltages. Furthermore, a surface roughness of this magnitude will also result in significant non-uniformity of switching voltage across the area of the display since the switching voltage is directly related to the thickness of the coated layer. The self-assembled droplets or domains in the present close-packed monolayer demonstrates a RMS surface roughness of less than 1.5 microns, more preferably less than 1.0 microns and most preferably less than 0.5 microns.

The following examples are provided to illustrate the invention.

EXAMPLE 1

Invention

This example shows fabrication and evaluation of a guest-host PDLC display by the method of our invention.

The dichroic dye Blue AB4 from Nematel, Germany was combined with the nematic host mixture BL087 from Merck to prepare a guest-host liquid crystal composition containing 1 wt % dichroic dye A dispersion of the guest-host liquid crystal composition was prepared as follows. To 241 grams of distilled water was added 3.6 grams of Ludox™ colloidal silica suspension and 7.4 grams of a 10% w/w aqueous solution of a copolymer of methylaminoethanol and adipic acid. To this was added 108 grams of the guest-host liquid crystal composition. The mixture was stirred using a Silverson mixer at 5000 rpm. It was then passed through a microfluidizer at 3000 psi. Finally, the resulting dispersion was passed through a 23 μm filter. The droplet size distribution in the dispersion was measured using a Coulter Counter. It was found that the mean size was 9.7 microns with a coefficient of variation (cv) of 0.14.

The above dispersion was mixed with an aqueous solution of fish skin gelatin from Norland Products Inc. having a weight-average molecular weight of 83,800 and a polydispersity of 3.4, an aqueous solution of polyvinylalcohol (PVA) (type GL-05 from Nippon Gohsei Limited), a solution of Aerosol OT in water and a solution of bis(vinylsulfonyl) methane in water to give a coating composition containing 15% w/w guest-host liquid crystal material, 4.5% fish skin gelatin, 0.5% PVA, 0.07% Aerosol OT coating aid and 0.1% bis(vinylsulfonyl)methane crosslinker. The composition was spread over a plastic support with a thin layer of indium tin oxide (ITO) at 37.67 $cm^3/m^2$ to give a dry uniform coverage of about 5400 $mg/m^2$ of guest-host liquid crystal material. The PVA prevented agglomeration of the liquid crystal domains during self-assembly and helped minimize defects in the coating. The plastic support (Dupont ST504) with a sputter coated ITO conductive layer (300 ohm/sq resistivity) was obtained from Bekaert. The thickness of the ITO layer is approximately 240 Angstroms. During the operation, the plastic support was placed over a coating block that was maintained at room temperature (23° C.) and the coating composition was also delivered or applied at the same temperature. The resulting coating was then dried under ambient conditions (23° C.). The fish gelatin does not chill set at room temperature and, thus, had not chill set at the onset of drying.

A sample of the dried coating was positioned facing a helium-neon laser (Spectra Physics model 155A). Diffraction rings caused by Franunhofer diffraction were observed on a sheet of white paper held behind the coating indicating an ordered close-packed monolayer of droplets.

The coating was kept aside for 48 hours to allow the crosslinking of gelatin to go to completion. The coating was then placed on a coating block that was maintained at room temperature (23° C.). A composition containing 4 wt % Type IV cattle gelatin, 3.2 wt % dispersed titania (Ti-Pure R-706 from DuPont) and 0.1 wt % Aerosol OT in distilled water was then spread over it using a coating knife to constitute the protective overcoat. The coating was dried at room temperature. For this top layer or protective overcoat, the temperature of the coating block and the drying temperature were both below the sol-gel transition temperature of the binder. A silver based conductive ink was then screen printed over the dried protective layer to complete construction of the display device.

Figure 2:
FIG. 2 is a photograph of an embodiment of the present invention, showing a switched and un-switched sample of a display.
Figure 3:
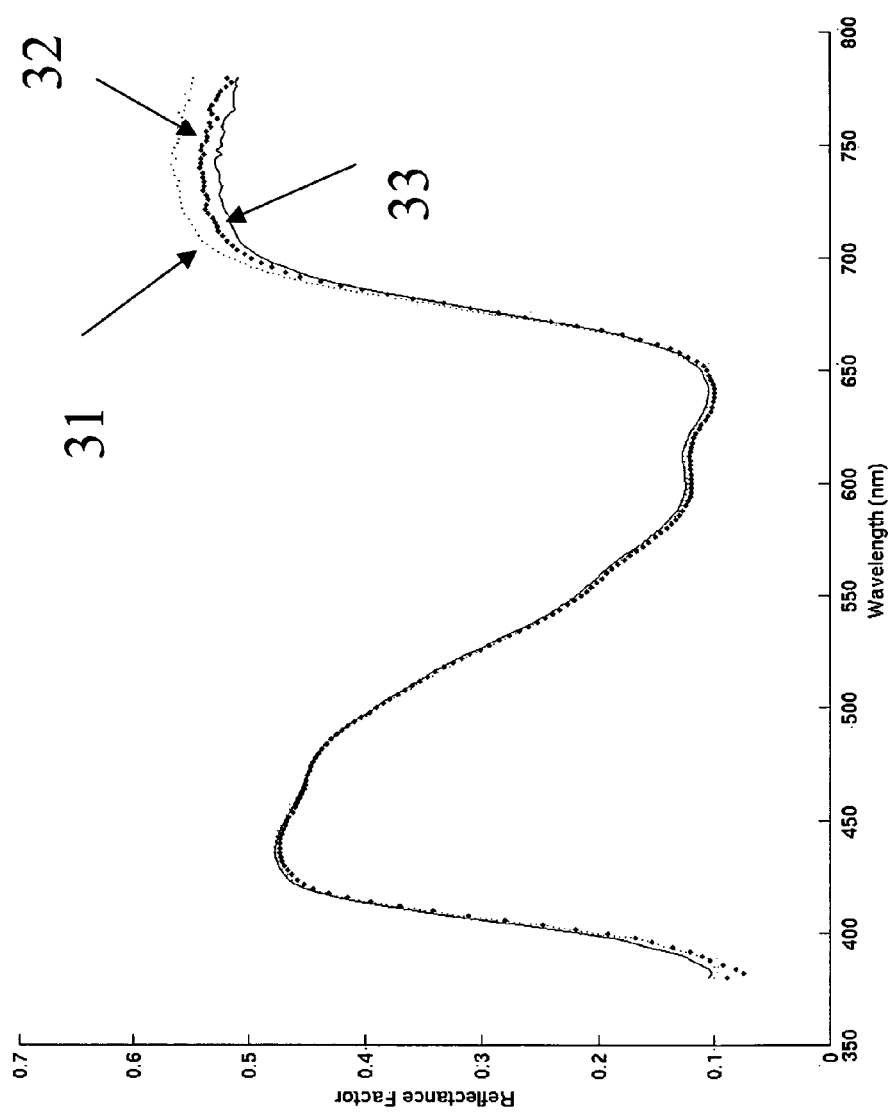
FIG. 3 shows reflectance spectra at different viewing angles for a sample prepared according to the method of the invention.

FIG. 1 is a schematic showing the architecture of a completed display device. The device includes a support 16, a transparent conductive layer on the support, which is coated with a light modulating guest-host layer 11. The guest-host layer 11 comprises a monolayer of ordered domains 14 containing a nematic liquid crystal host and a dichroic dye. An optional white color contrast/barrier layer 13 is applied to the light modulating layer, followed by a second conductive layer 12, such as a printed silver electrode. FIG. 2 shows the switched (white) state 21 and the unswitched (blue) state 22 of the display at 40 V when driven by a 1000 Hz AC square wave. FIG. 3 shows the reflectance spectra of the blue state at different viewing angles of 45 degrees 31, 60 degrees 32 and viewing angle 22.5 degrees 33 measured using a Photo Research 705 spectroradiometer. Data at each viewing angle is plotted as reflectance factor (sample radiance divided by white reference radiance) as a function of wavelength. The illuminant was a 100 W quartz tungsten halogen lamp fitted with a Corning C5900 filter to provide a lighting equivalent to D65 lighting or sunlight. It is clear that the colored state spectrum of the sample is almost invariant with viewing angle.

EXAMPLE 2

Control

This example shows fabrication and evaluation of a cholesteric or chiral nematic PDLC display.

A chiral nematic liquid crystal (CLC) composition with wavelength of reflection centered around 550 nm was prepared by adding an appropriate amount of high twist chiral dopant to the nematic host BL087 (from Merck).

A dispersion of the CLC composition was prepared and coated in a manner similar to that described for the guest-host liquid crystal material in Example 1 except that a dispersion of carbon black was used as contrast control agent in the overcoat layer in place of titania.

Figure 4:
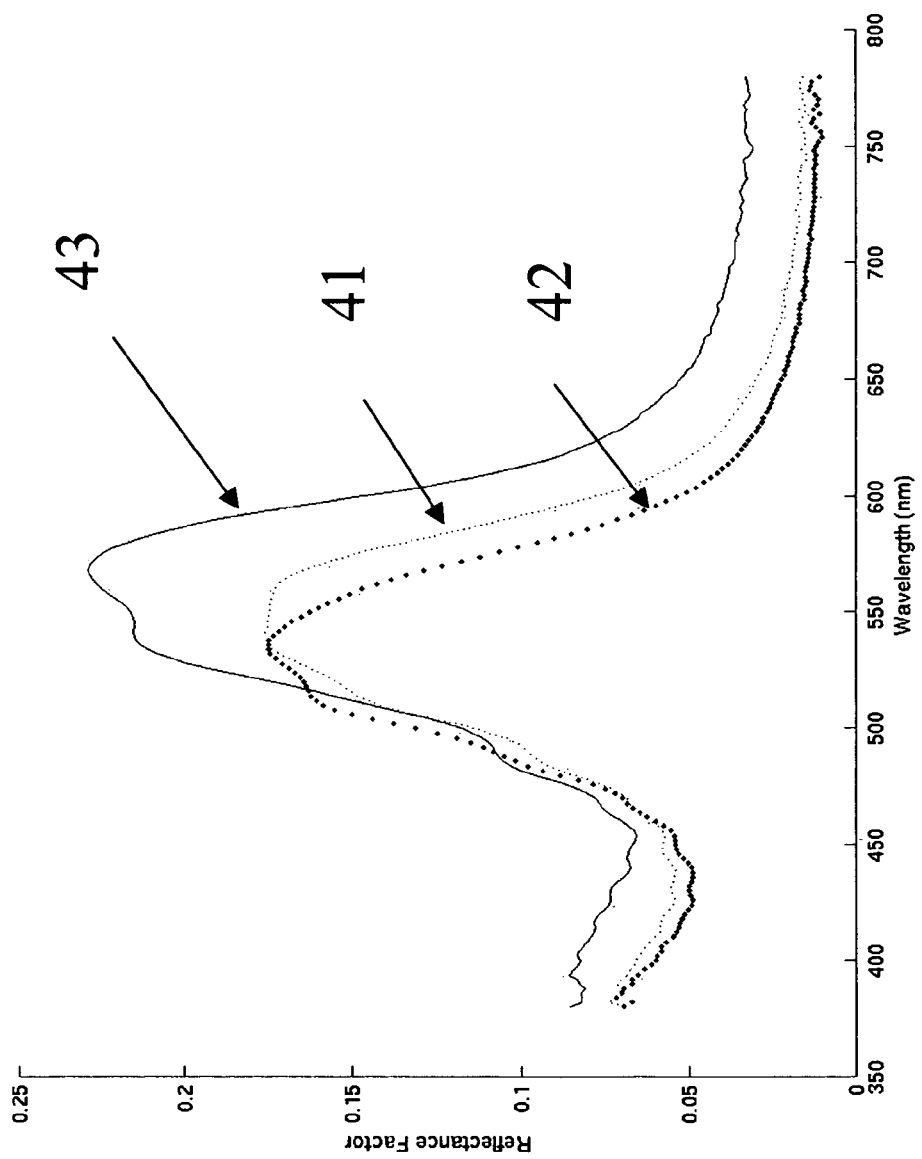
FIG. 4 shows reflectance spectra at different viewing angles for a control sample.

FIG. 4 shows the reflectance spectra of the green reflecting state of the sample at different viewing angles of 45 degrees 41, 60 degrees 42 and viewing angle 22.5 degrees 43 measured using the same apparatus described in Example 1. In this case there is a noticeable shift in the reflectance spectrum to lower wavelengths at higher viewing angles resulting in an overall appearance that is dissimilar to ink on paper that may be objectionable in certain applications.

The invention has been described in detail with particular reference to certain preferred embodiments thereof, but it will be understood that variations and modifications can be effected within the spirit and scope of the invention.

The invention claimed is:

1. A display comprising at least one substrate, at least one electronically modulated imaging layer and at least one electrically conductive layer, wherein said electronically modulated imaging layer comprises a self-assembled, close-packed, ordered monolayer of domains of guest-host material, the domains are dispersed as micron sized droplets in an aqueous medium mixed with a suitable binder material, wherein said guest-host material comprises a dichroic or pleochroic dye guest in a light modulating host in a fixed polymer matrix, and wherein said display is independent of viewing angle and wherein said dichroic or pleochroic dye guest is at least one dye selected from the group consisting of 4,4'-bis(4-N,N-dimethylamino-2,6-dimethylphenylazo) azobenzene, 4,4'-bis-(4-N,N-dimethylamino-2-phenylazo) azobenzene, 4,4'-bis-(4-N,N-diethylamino-2-methylphenylazo)azobenzene, 4,4'-bis-[2,5-dimethyl-4-(4-ethybminonaplithylazo)-phenylazo azobenzene and 4,4'-bis-[2,5-dimethy-4-(4-methylaminonaphthylazo)phenylazo] lazobenzene.

2. The display of claim 1 wherein said substrate is flexible.

3. The display of claim 1 wherein said host comprises a nematic or a smectic host material.

4. The display of claim 1 wherein said self-assembled, close-packed, ordered monolayer of domains of guest-host material is a hexagonally closest packed ordered monolayer of domains.

5. The display of claim 1 wherein said self-assembled, close-packed, ordered monolayer of domains of guest-host material in a polymer matrix has a thickness of from 2-10 µm.

6. The display of claim 1 wherein said self-assembled, close-packed, ordered monolayer of domains of guest-host material in a polymer matrix has a domain size range of from 5 to 15 microns.

7. The display of claim 6 wherein said domain size range has a coefficient of variation of less than 0.2.

8. The display of claim 1 wherein said dichroic or pleochroic dye guest is aligned by said host to produce contrasting light absorptive states in response to a selective external electric field.

9. The display of claim 1 wherein said dichroic or pleochroic dye guest comprises at least one benzene-based azo dyes, stilbene-based dyes, and anthraquinone-based dyes.

10. The display of claim 1 wherein said dichroic or pleochroic dye guest has an order parameter greater than 0.7.

11. The display of claim 1 wherein said polymer matrix comprises polymer latex.

12. The display of claim 1 wherein said polymer matrix comprises polyurethane latex.

13. The display of claim 1 wherein said polymer matrix comprises at least one latex selected from the group consisting of urethane, styrene, esters of alpha-methylene aliphatic mono-carboxylic acids, and vinylidene halides.

14. The display of claim 1 wherein said polymer matrix comprises aqueous suspensions of polyesters, polyolefins or combinations thereof.

15. The display of claim 1 wherein said polymer matrix comprises gelatin.

16. The display of claim 15 wherein said gelatin is fish gelatin.

17. The display of claim 1 wherein said fixed polymer matrix comprises fish skin gelatin, PVA, Aerosol OT coating aid and bis(vinylsulfonyl)methane crosslinker.

18. The display of claim 1 wherein said electronically conductive polymer comprises polythiophene.

19. The display of claim 1 wherein said at least one electrically conductive layer comprises indium tin oxide (ITO).

20. The display of claim 1 wherein said at least one electrically conductive layer is a printed silver electrode.

21. The display of claim 1 further comprising a white color contrast layer.

22. The display of claim 21 wherein said white layer comprises milled nonconductive pigments having a particle size of below 1 micron.

23. The display of claim 21 wherein said white layer reflects all wavelengths of light across the visible light spectrum from 400 nanometers to 700 nanometers wavelength.

24. The display of claim 21 wherein said white layer comprises titania.

25. The display of claim 21 wherein said white layer is a barrier layer.

26. The display of claim 1 wherein said appearance independent of viewing angle is determined by measuring the reflectance factor of said display at viewing angles of 45 degrees, 60 degrees, and 22.5 degrees using a spectroradiometer illuminated with a light source to provide a lighting equivalent to D65 lighting or sunlight.

* * * * *